No. 891,952. PATENTED JUNE 30, 1908.
R. V. R. REYNOLDS.
DEVICE FOR ATTACHING ENGINEERING INSTRUMENTS TO THEIR SUPPORTS.
APPLICATION FILED DEC. 16, 1907.
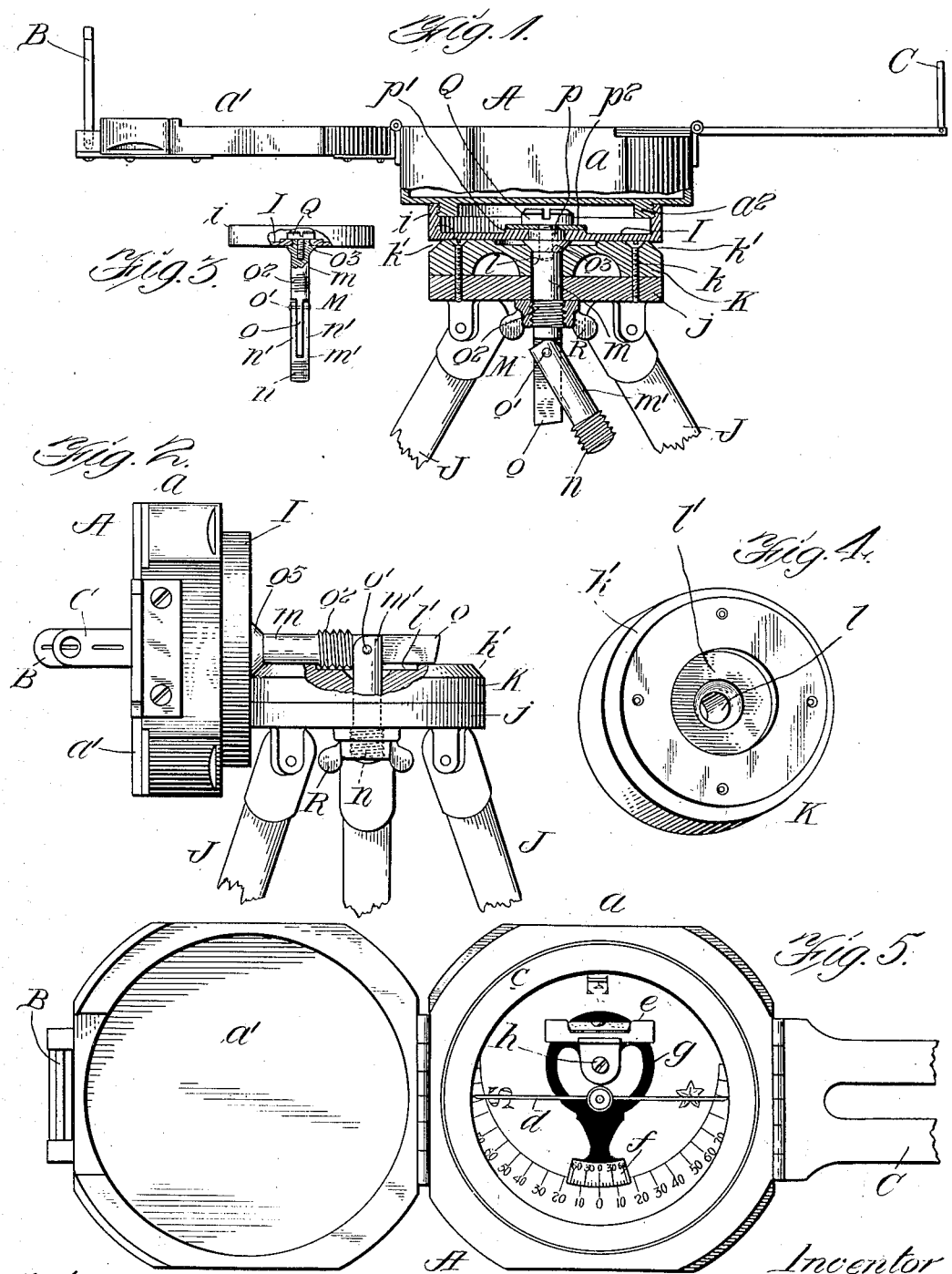

UNITED STATES PATENT OFFICE.

ROBERT V. R. REYNOLDS, OF SALT LAKE CITY, UTAH.

DEVICE FOR ATTACHING ENGINEERING INSTRUMENTS TO THEIR SUPPORTS.

No. 891,952.  Specification of Letters Patent.  Patented June 30, 1908.

Application filed December 16, 1907. Serial No. 406,765.

*To all whom it may concern:*

Be it known that I, ROBERT V. R. REYNOLDS, a citizen of the United States, residing in Salt Lake City, in the county of Salt Lake and State of Utah, have invented certain new and useful Improvements in Devices for Attaching Engineering Instruments to Their Supports, of which the following is a specification.

The primary object of my invention is to provide novel devices for attaching surveying instruments, cameras and other engineering instruments to tripods or other supports on which they are mounted.

The Brunton pocket transit, the Abney level, the stadia hand level, and the pocket alt-azimuth are all well-known instruments which are light and portable, but which have no fixed supports and their accuracy is somewhat impaired on that account. According to my invention I increase the accuracy of these and other similar instruments, while permitting them to remain readily portable, by providing novel means whereby they may be conveniently attached to a light easily carried and conveniently managed tripod, or some such support, and which will permit each or any of said instruments to be used in its various functions as compass, level or hypsometer to the limit of its possibilities of accuracy, the devices employed permitting the instrument to be held firmly on its support in any of the positions or planes necessary in making the desired observation to which it is adapted.

In carrying out my invention in the most approved way, I provide a spindle which is bendable between its opposite ends, one end being securely attached to the base of the instrument and said spindle extending through the head of the tripod or similar support, being provided on its lower or outer end with securing devices arranged beneath the tripod head. When the spindle is straight or not bent, the securing devices are engaged with the spindle to hold the instrument in a horizontal plane, and when the spindle is bent, the securing devices are shifted and so engage the spindle as to hold the instrument in a vertical plane.

In the accompanying drawings, Figure 1 is a view partly in vertical section and partly in side elevation of a Brunton pocket transit attached to a tripod by my improved attaching devices, the instrument in this instance being held in a horizontal plane. Fig. 2 is a side elevation of the apparatus shown in Fig. 1 with certain parts broken away, but showing the instrument in a vertical plane. Fig. 3 is a view on a small scale with parts broken away of my improved securing devices adapted to be applied to the base of an engineering instrument, such as a Brunton compass, detached from the instrument and from the tripod or support. Fig. 4 is a perspective view of the cylindrical block or plate which is interposed between the head of the tripod or support and the instrument and it aids in connecting the support with the instrument. Fig. 5 is a view on an enlarged scale showing the interior of the instrument.

The Brunton pocket transit A is of well-known construction, comprising a casing $a$, a hinged top $a'$, and hinged sights B and C. The degree circle is indicated at $c$, the magnetic compass needle at $d$, the bubble tube at $e$, and the vernier at $f$. The vernier is carried by a frame or arm $g$ pivoted at $h$. Any suitable devices may be employed for adjusting the vernier and with it the bubble tube $e$, which is also supported on the frame or arm $g$. The bottom of the casing $a$ is formed with a circular threaded flange $a^2$ adapted to engage with the threaded flange $i$ of a circular plate or disk I forming part of the devices which I employ for attaching the instrument to its support. I have shown in the drawings a support consisting of a tripod J, of well-known construction, provided with a head or top plate $j$ to which is secured, by means of screws $k$, a circular block or plate K. It is not necessary to in any way adjust the block K on the support J, but whenever desired the block K may be removed from the tripod and can be readily attached to the head of any tripod of usual construction. The top plate $j$ of the support and the block K are formed with central circular openings which register with each other, as clearly shown in Fig. 1. The upper outer edge of the plate K is beveled, as shown at $k'$. This beveled portion extends entirely around the upper outer edge of the base, as indicated in Fig. 4. The upper portion of the opening $l$ in the block K is tapered or flared outwardly, and around this opening a groove or circular recess or depression $l'$ is provided.

The head of the tripod being thus equipped is attached to the flanged plate I by the novel devices next to be described. I premise by saying, however, that one of the principal objects of the invention is to provide devices by means of which an instrument, of the kinds above mentioned, may be held securely in a horizontal plane, or adjusted in said horizontal plane and held firmly, and which can also be turned to a vertical plane and held firmly in place. Such devices possessing these characteristics are provided, according to my invention, by a bendable spindle M, comprising an upper member $m$ and a lower member $m'$. The lower member $m'$ is circular in cross section and at its lower end is provided with a fine thread $n$ which extends back from the extreme lower end for a considerable distance terminating below the bifurcated upper portion $n'$ of this member. The upper member $m$ is formed with a downwardly extending centrally arranged tongue $o$ which projects into the bifurcated portion of the lower member and is pivotally connected therewith by a pin $o'$. Above the upper end of the tongue the upper member is threaded at $o^2$, and above this threaded portion it is provided with an enlargement or head $o^3$ which has a beveled or conical lower portion adapted to fit the flared upper end of the hole $l$ in the plate K. Above this head is a cylindrical portion $p$ of less diameter than the head which extends into the central opening or hole of the flanged plate I which it neatly fits. This hole is preferably surrounded by a boss $p'$ upon which is preferably placed a washer $p^2$. The bendable spindle is firmly attached to the flanged plate I by means of a screw Q which extends through the washer $p^2$ and into the upper member of the bendable spindle in the manner clearly indicated. By these devices just described, the upper member of the spindle may be securely fastened to the flanged plate I which is in turn attached to the instrument securely, in the manner before described, and these devices hold the instrument correctly when thus attached. The lower member $m'$ of the bendable spindle may be turned to one side in the manner indicated, or the two members may be made to assume a position at right angles to each other, as shown in Fig. 2. When the instrument is adjusted to the proper position it may be clamped to the support by means of a clamping nut R which is adapted to engage the threads at the lower end of the lower member or the threads $o^2$ of the upper member.

In Fig. 1, the instrument may be used in reading azimuths, the clamping nut being engaged with the upper set of threads $o^2$ and bearing against the under side of the tripod head. When thus arranged, the tripod is securely fastened to the instrument, but by manipulating the nut the instrument may be conveniently adjusted in azimuth or any desired amount of friction established between the surfaces of the parts I and K which lie in contact.

In the position shown in Fig. 2 the compass may be used either as a level or a clinometer by proper observation through the sights and reading the movable level provided with the vernier arm or frame above referred to. In order to shift the instrument to the position shown in Fig. 2, the clamping nut R should be removed from the spindle by first unscrewing it from the threads $o^2$, then causing it to engage the thread $n$, and finally withdrawing the nut entirely from the spindle, then the spindle should be raised out of the support J and block K and the upper member made to assume a position at right angles to the lower member, as indicated in Fig. 2. When in this position the threaded lower end of the lower member of the spindle will project slightly below the bottom of the tripod head. The clamping nut may then be applied in the manner indicated and this will draw the beveled head $o^3$ against the beveled edge $k'$ of the block K, the outer end of the tongue $o$ resting on the top of the block K outside the annular groove or recess $l'$. It will be observed that the threaded portion $o^2$ of the upper member $m$ does not bear against the top of the block K but is received in the recess $l'$ and thus injury to the screw threads is avoided, but the portion of the member $m$ between its head and the threads $o^2$ may bear upon the top of the block. When in the position shown in Fig. 2, the nut may be loosened slightly and the instrument turned about the vertical axis of the spindle to any desired position, the head $o^3$ gliding on the beveled edge $k'$, but when thus adjusted to the desired extent the nut R may be tightened and then the upper member of the spindle will be drawn firmly into place, in the manner above specified.

The flanged plate I is a device which enables me to conveniently adapt my securing devices to a Brunton pocket transit, but there are, of course, other devices by means of which the bendable spindle may be applied to surveying, engineering or other instruments.

When a Brunton instrument is attached to a tripod by my improved devices it can be leveled in either of two positions by moving the tripod legs on the ground or by telescoping them. To do this the vernier should be set at zero when the compass is in the vertical or side position, and, in either case, at least two adjustments should be made, the compass being turned each time to a position at right angles (in the plane of the horizon) to that occupied by the bubble tube in the previous adjustment.

I claim as my invention:—

1. Devices for attaching an engineering instrument to its support, comprising a bendable spindle adapted to be firmly attached to the instrument, and means for rigidly securing the spindle to the support of the instrument both when in its bent and when in its unbent condition.

2. Devices for attaching an engineering instrument to its support, comprising a spindle made in two parts hinged together, one of which parts is provided with means for firmly securing it to the instrument and which two-part spindle is provided with means adapted to engage it either above or below the hinge to clamp it to the support.

3. Devices for attaching an engineering instrument to its support, comprising a spindle made in two parts, one of which is provided with means for firmly attaching it to the instrument and has a pivotal interlocking connection with the other part, and means adapted to engage the spindle either above or below its pivotal connection to clamp it to the support.

4. The combination with the base of an instrument, of a two-part bendable spindle, means for firmly attaching one member of the spindle to the instrument, and means carried by the spindle for rigidly holding the instrument on its support both in a horizontal and in a vertical position.

5. The combination with the head of the support, of a block attached thereto having a central opening and a groove around this opening, a bendable spindle extending through the central opening of the block made in two parts hinged together and provided with screw-threads above and below the hinge, the upper of said screw-threads being adapted at times to enter the groove surrounding the central opening of the block, and means for clamping the spindle with the upper part in either a vertical or a horizontal position.

6. The combination of a plate adapted to be connected with the instrument, a bendable spindle attached to the plate, and clamping devices adapted to connect with the spindle either above or below its line of bending.

7. The combination of a block provided with a beveled outer edge and with a flared central opening, of a bendable spindle having a large beveled head adapted to engage either the beveled edge of the block or the flared central opening therein, and devices for clamping the spindle to a support.

ROBERT V. R. REYNOLDS.

Witnesses:
R. E. BENEDICT,
E. H. CLARKE.